(12) United States Patent
Xu et al.

(10) Patent No.: US 11,416,096 B2
(45) Date of Patent: Aug. 16, 2022

(54) EXTENDED SENSING MULTI-TOUCH SYSTEM

(71) Applicant: Texas Instruments Incorporated, Dallas, TX (US)

(72) Inventors: Kangcheng Xu, Shanghai (CN); Jun Zhang, Shanghai (CN)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 15/972,410

(22) Filed: May 7, 2018

(65) Prior Publication Data

US 2019/0204980 A1 Jul. 4, 2019

Related U.S. Application Data

(63) Continuation of application No. PCT/CN2017/120418, filed on Dec. 31, 2017.

(51) Int. Cl.
*G06F 3/044* (2006.01)
*G06F 3/041* (2006.01)

(52) U.S. Cl.
CPC ............ *G06F 3/0416* (2013.01); *G06F 3/044* (2013.01); *G06F 3/0446* (2019.05); *G06F 3/04166* (2019.05); *G06F 2203/04104* (2013.01)

(58) Field of Classification Search
CPC .................. G06F 3/0416; G06F 3/044; G06F 2203/04104
USPC .................................................. 345/156–184
See application file for complete search history.

(56) References Cited

U.S. PATENT DOCUMENTS

| | | | | |
|---|---|---|---|---|
| 2012/0268142 | A1* | 10/2012 | Kremin | G06F 3/04166 324/658 |
| 2014/0218331 | A1* | 8/2014 | Chang | G06F 3/0446 345/174 |
| 2014/0354577 | A1* | 12/2014 | Hanssen | H03K 17/9622 345/174 |

(Continued)

FOREIGN PATENT DOCUMENTS

| | | |
|---|---|---|
| CN | 101907941 A | 12/2010 |
| CN | 103186302 A | 7/2013 |
| EP | 3049902 A1 | 8/2016 |

OTHER PUBLICATIONS

International Search Report dated Sep. 27, 2018, International Application No. PCT/CN2017/120418, 6 pages.

(Continued)

*Primary Examiner* — Carolyn R Edwards
(74) *Attorney, Agent, or Firm* — Brian D. Graham; Charles A. Brill; Frank D. Cimino

(57) ABSTRACT

A capacitive touch sensing device, with: (i) a logical array of capacitive buttons have a number R of rows and a number C of columns; (ii) a first node coupled to a first column in the number C of columns, the first node for receiving a first transmit voltage; (iii) a second node coupled to a second column in the number C of columns, the second node for receiving a second transmit voltage; (iv) a number of intermediate nodes between the first node and the second node, wherein each intermediate node is coupled to a respective column in the number C of columns; and (v) circuitry for applying a respective different voltage to each of the intermediate nodes in response to the first transmit voltage and the second transmit voltage.

20 Claims, 4 Drawing Sheets

(56) References Cited

U.S. PATENT DOCUMENTS

| | | | |
|---|---|---|---|
| 2015/0091859 A1* | 4/2015 | Rosenberg | G06F 3/0441 |
| | | | 345/174 |
| 2015/0162932 A1* | 6/2015 | Page | G01R 27/2605 |
| | | | 324/658 |
| 2015/0277631 A1* | 10/2015 | Oishi | G06F 3/04166 |
| | | | 345/174 |
| 2015/0339987 A1* | 11/2015 | Han | G09G 3/3696 |
| | | | 345/89 |
| 2016/0162073 A1* | 6/2016 | Yilmaz | G06F 3/0412 |
| | | | 345/174 |

OTHER PUBLICATIONS

Written Opinion dated Sep. 27, 2018, International Application No. PCT/CN2017/120418, 4 pages.
Extended European Search Report for EP 17936284.3 dated Dec. 12, 2020.

\* cited by examiner

EXTENDED SENSING MULTI-TOUCH SYSTEM

BACKGROUND

The preferred embodiments relate to capacitive sensing and, more particularly, to a capacitive multi-touch sensing system.

Capacitive touch sensing is widely used as an interface for various electronic devices, including proximity sensors, position or displacement sensors, humidity sensors, and electronic devices with motion/touch detection, where typically the sensing detects a change in capacitance, in response to a human or other material (organic or inorganic) in contact or proximity with the sensor. A typical capacitive sensor, sometimes referred to as a button, is formed by a capacitive device, including at least two conductors separated from one another (e.g., by a dielectric material, including air). Typically, an overlay material is atop the conductors, and the person or other contacting mechanism thusly approaches or touches the overlay, thereby changing the capacitance of the button. Various technology exists in the state of the art for coupling to such a button, or a number of buttons, to detect the change in capacitance arising from a "touch" of the button, typically relative to a "no-touch" scenario, that is, by comparison to a measure of the button capacitance when it is known that the contacting mechanism is away from the button. Such technology includes the current CapTIvate Technology, offered by Texas Instruments Incorporated, and that includes devices (e.g., microcontrollers) with input/output connectivity to capacitive buttons and internal structure for measuring capacitance of such buttons. In one approach, change in capacitance relative to earth ground can be detected, which is commonly referred to as self-capacitance. In another approach, change in capacitance can be detected resulting from a received signal measured at one capacitor plate, in response to a transmitted signal at the other capacitor plate, which is commonly referred to as mutual capacitance. Mutual capacitance applications can have various design benefits, for example keypads implementing this approach have closed grouped keys implemented as capacitive buttons, without worry of cross-coupling when a user touches a button but is not precisely centered directly on one key. Routing of lines (typically referred to as channels or scanning channels) is also more easily achieved in mutual capacitance applications.

While the above approaches have had success in certain implementations, many of the devices that use capacitive sensing are mobile (or other) devices that have a limited amount of space for physical hardware. Moreover, with larger touch areas, the number of buttons (i.e., touch detecting regions) and scanning channels are increased significantly. Still further, with many smaller devices, area consumed by implementation affects matters of cost, aesthetics, and favorability at various levels in the competitive marketplace. Thus, while prior approaches have been workable in some applications, the present inventors seek to improve upon the prior art, as further detailed below.

SUMMARY

In an embodiment, there is a capacitive touch sensing device, comprising: (i) a logical array of capacitive buttons have a number R of rows and a number C of columns; (ii) a first node coupled to a first column in the number C of columns, the first node for receiving a first transmit voltage; (iii) a second node coupled to a second column in the number C of columns, the second node for receiving a second transmit voltage; (iv) a number of intermediate nodes between the first node and the second node, wherein each intermediate node is coupled to respective column in the number C of columns; and (v) circuitry for applying a respective different voltage to each of the intermediate nodes in response to the first transmit voltage and the second transmit voltage.

Numerous other inventive aspects are also disclosed and claimed.

DETAILED DESCRIPTION

Figure 1A:
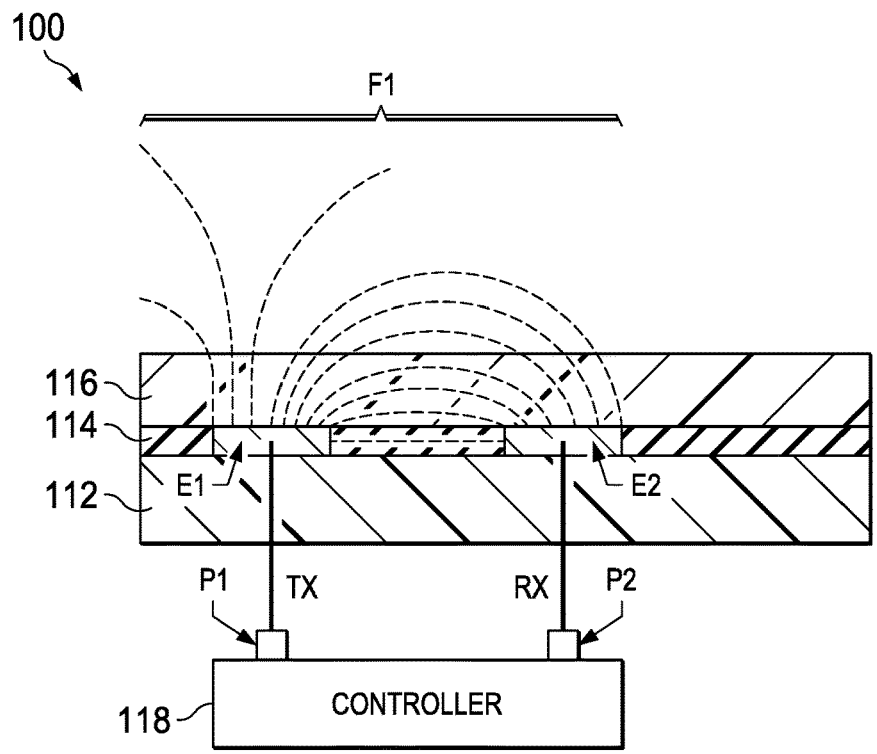
FIGS. 1A and 1B illustrate a partial cross-sectional and perspective view of a preferred embodiment touch sensor.
Figure 1B:
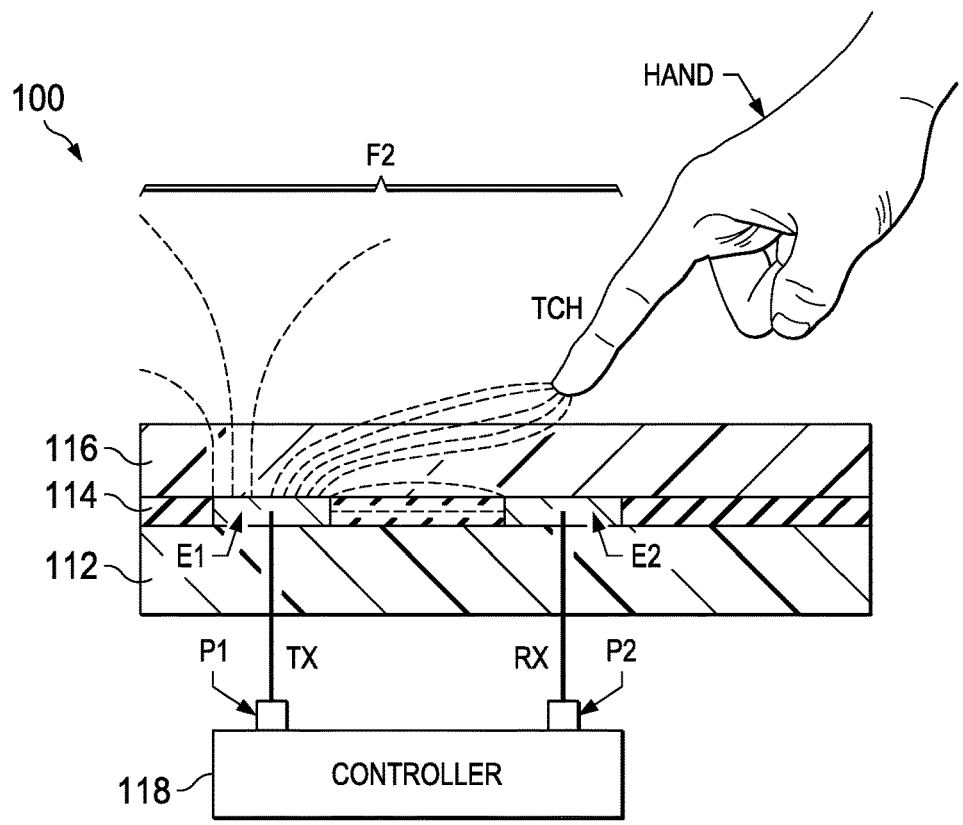

FIGS. 1A and 1B illustrate a partial cross-sectional and perspective view of a sensor 100, as may be implemented in a system of a preferred embodiment. Sensor 100 includes a supporting substrate 112, such as a printed circuit board (PCB), so as to provide physical support and facilitate electrical connectivity to various related components. Substrate 112 supports two electrodes E1 and E2, such as metal or other conductors, separated from one another by a segment of a dielectric layer 114. While electrodes E1 and E2 are shown as singular members, various types of capacitive elements are contemplated, including circular elements, such as having a first circular electrode concentrically positioned within the inner diameter of a ringed-shaped second electrode. An overlay layer 116 is positioned atop electrodes E1 and E2 (and dielectric layer 114), where layer 116 is of any suitable material so that an electrical field, shown in FIG. 1A as field F1 and in FIG. 1B as field F2, can pass between electrodes E1 and E2 and rise above the upper surface of layer 116. Hence, it is desirous that electrodes E1 and E2 be shaped according to the thickness of material used for overlay 116 so as to optimize sensitivity and to allow a sufficient amount of the electric field between the electrodes to penetrate through and above the upper surface of overlay layer 116.

In connection with the operation of sensor 100, note that electrode E1 is connected to a transmit (TX) signal, and electrode E2 is connected to provide a receive (RX) signal, each in connection with respective pins P1 and P2 of a controller 118, where such pins also are sometimes referred to as channels or scanning channels. Controller 118, as detailed later, operates to perform a preferred embodiment methodology in connection with providing the TX signal, evaluating the RX signal, and determining a capacitance measure, such as via a count corresponding to a measure of capacitance, in response to the TX and RX signals. In any event, note here by way of introduction that in FIGS. 1A and 1B each TX and RX signal, therefore, occupies a corresponding pin on controller 118, which will be a salient observation later in that the overall need for the number of such pins, as well as certain internal circuitry within controller 118, is reduced according to preferred embodiments, thereby providing various beneficial comparisons to the more area-consuming and costly prior art. In all events, in FIG. 1B, a HAND is shown providing a touch TCH proximate or to overlay layer 116, and also illustrated is the resulting change (i.e., disturbance) in the electric field, as is evident in the shape change illustrated between field F1 of FIG. 1A and field F2 of FIG. 1B. This disturbance occurs as a result of the grounding effect of the human whose HAND is depicted, and it will change the measured capacitance, and more particularly in the case of measured mutual capacitance, the touch TCH will reduce the measured capacitance at electrode E2 (i.e., as measured based on the RX signal). Thus, by systematically scanning capacitance values of a number of buttons, each formed as an associated electrode pair akin to electrodes E1 and E2, the system can detect one or more of those buttons being touched at a time, as will be further explored below with additional figures and description.

Figure 2:
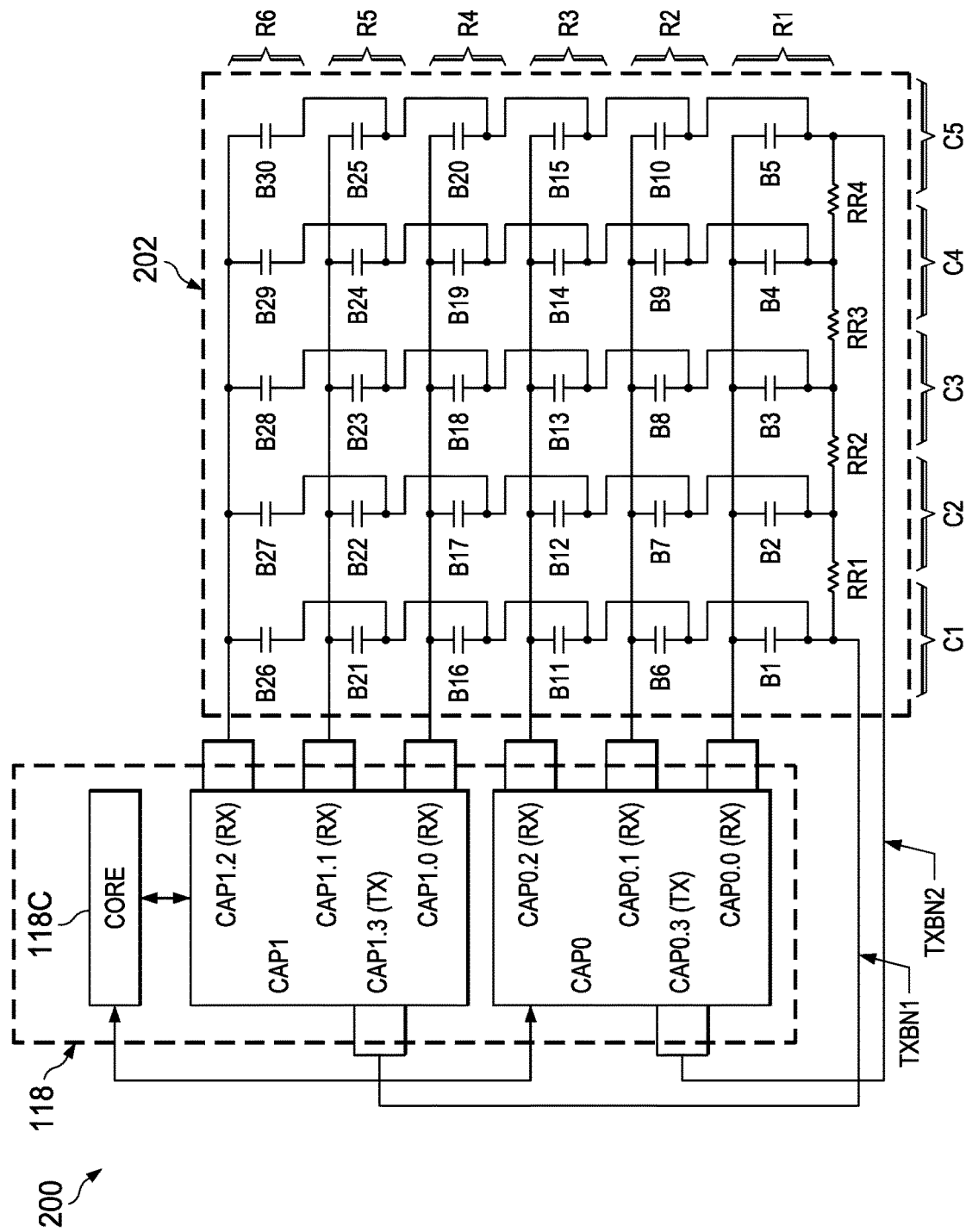
FIG. 2 illustrates an electrical block and schematic diagram of a preferred embodiment capacitance sensing system in greater detail.

FIG. 2 illustrates an electrical block and schematic diagram of a preferred embodiment capacitance sensing system 200, which again illustrates controller 118 from FIGS. 1A and 1B, along with additional aspects in greater detail. In general, controller 118 includes a core 118C, which will include various blocks (e.g., regulator, voltage and capacitance references, oscillator, timer, and conversion circuitry) as may be ascertained by one skilled in the art, such as by reference to document TI Designs, Touch Remote Control With CapTIvate™ Technology (document identification TIDUBT7A-July 2016-Revised December 2016) provided by Texas Instruments Incorporated, and herein incorporated herein by reference. Moreover, controller 118 includes two capacitance measurement blocks CAP0 and CAP1, each bi-directionally coupled to core 118C so as to communicate signals for detecting whether any capacitive button in a button set 202 is touched. Looking at blocks CPA0 and CAP1 in more detail, each block has four pins, with one of those pins providing a transmit (TX) signal and the other three pins receiving a receive (RX) signal. By convention in this document, each pin is named in the manner of CAPa.b, where a indicates the block number (i.e., 0 or 1) and b is a pin number for that block, ranging from 0 to 3 in the example herein discussed in which case each block CAP0 or CAP1 includes four pins, for reasons more evident later.

As introduced above, controller 118 connected to a button set 202, where set 202 includes a number (e.g., 30) of capacitive buttons B1 through B30. Each button Bx may be constructed as discussed in connection with FIGS. 1A and 1B, or in other manners known in the capacitive sensing art, so as to have a capacitance equal to that of all other buttons in the set (e.g., touch capacitance range of 0~300 pF for mutual mode). For sake of discussion, buttons B1 through B30 are described as an array with six rows R1 through R6 and five columns C1 through C5, where such connectivity also may be, but is not necessarily, followed in the physical layout of the buttons relative to one another; thus, the term "array" or "grid" is intended herein as a logical construct, which also can be copied physically but is not required, where logically therefore a different subset of row buttons is connected to a respective receive pin on either block CAP0 or CAP1, and a respective column button from each row subset is also connected to receive a transmit signal, as further explored below. Thus, in the example of the logical array, the rows shown in FIG. 2 correspond to buttons as shown in the following Table 1:

TABLE 1

| Row | Buttons |
| --- | --- |
| R1 | B1-B5 |
| R2 | B6-B10 |
| R3 | B7-B15 |
| R4 | B8-B200 |
| R5 | B21-B25 |
| R6 | B26-B30 |

Each row Rx of buttons includes a number (e.g., five, equal to the number of columns in the set) of capacitors, where the upper plate of all capacitors in that row are connected to a same receive pin on one of the two capacitance measurement blocks CAP0 and CAP1. For example, the upper plate of all capacitors forming buttons B1 through B5 in row R1 are connected to a receive pin, CAP0.0, in block CAP0. As another example, the upper plate of all capacitors forming buttons B6 through B10 in row R2 are connected to a receive pin, CAP0.1, in block CAP0. Thus, summarizing all of the row connections to respective receive pins is as shown in the following Table 2:

TABLE 2

| Row | Block pin |
| --- | --- |
| R1 | CAP0.0 (RX) |
| R2 | CAP0.1 (RX) |
| R3 | CAP0.2 (RX) |
| R4 | CAP1.0 (RX) |
| R5 | CAP1.1 (RX) |
| R6 | CAP1.2 (RX) |

Completing the connections between button set 202 and capacitance measurement blocks CAP0 and CAP1, note that set 202 includes two TX bias nodes TXBN1 and TXNBN2. TX bias node TXBN1 is connected to a transmit pin CAP1.3 of capacitance measurement block CAP0, and TX bias node TXBN2 is connected to a transmit pin CAP0.3 of capacitance measurement block CAP0. Further, TX bias node TXBN1 is connected to the bottom plate of each capacitor button in column C1 (i.e., of B1, B6, B11, B16, B21, B26), and TX bias node TXBN2 is connected to the bottom plate of each capacitor button in column C2 (i.e., of B5, B10, B15, B20, B25, B30). Also between TX bias nodes TXBN1 and TXBN2 is a voltage (e.g., resistor) divider, namely in a preferred embodiment including: (i) a first resistor RR1 connected between the bottom plates of all capacitor buttons in column C1 and all the bottom plates of all capacitor buttons in column C2; (ii) a second resistor RR2 connected between the bottom plates of all capacitor buttons in column C2 and all the bottom plates of all capacitor buttons in column C3; (iii) a third resistor RR3 connected between the bottom plates of all capacitor buttons in column C3 and all the bottom plates of all capacitor buttons in column C4; and (iv) a fourth resistor RR4 connected between the bottom plates of all capacitor buttons in column C4 and all the bottom plates of all capacitor buttons in column C5. In a preferred embodiment, resistors RR1 through RR5 are discrete devices on the PCB, and the normal value is 10 kohm for each resistor. The selection of value for these resistors is depend on the RC (i.e., resistance times capacitance) time constant, where C is total mutual capacitance on each line. The preferential rule is that the time constant needs to meet the setting time of the TX transmission pulse. For example, where the TX pulse frequency is 1 MHz (pulse width=1 us), the RC time constant need to less than $\frac{1}{10}*1$ μsec. Further in connection with the desirability of equal resistance for all of resistors RR1 through RR4, and as further detailed below, note that the equal resistance, across a number N of resistors between nodes TXBN1 and TXBN2, will therefore equally divide the voltage between those nodes relative to each of columns C1 through C5. For example, if a voltage V is transmitted by pin CAP1.3 (TX) to node TXBN1 and at the same time a ground is connected by pin CAP0.3 (TX) to node TXBN2, then the voltage at the bottom plates of the capacitor buttons in each column will be as shown in the following Table 3:

TABLE 3

| Column | Button bottom plate voltage |
|--------|------------------------------|
| C1     | V                            |
| C2     | .75 V                        |
| C3     | .5 V                         |
| C4     | .25 V                        |
| C5     | 0                            |

Figure 3:
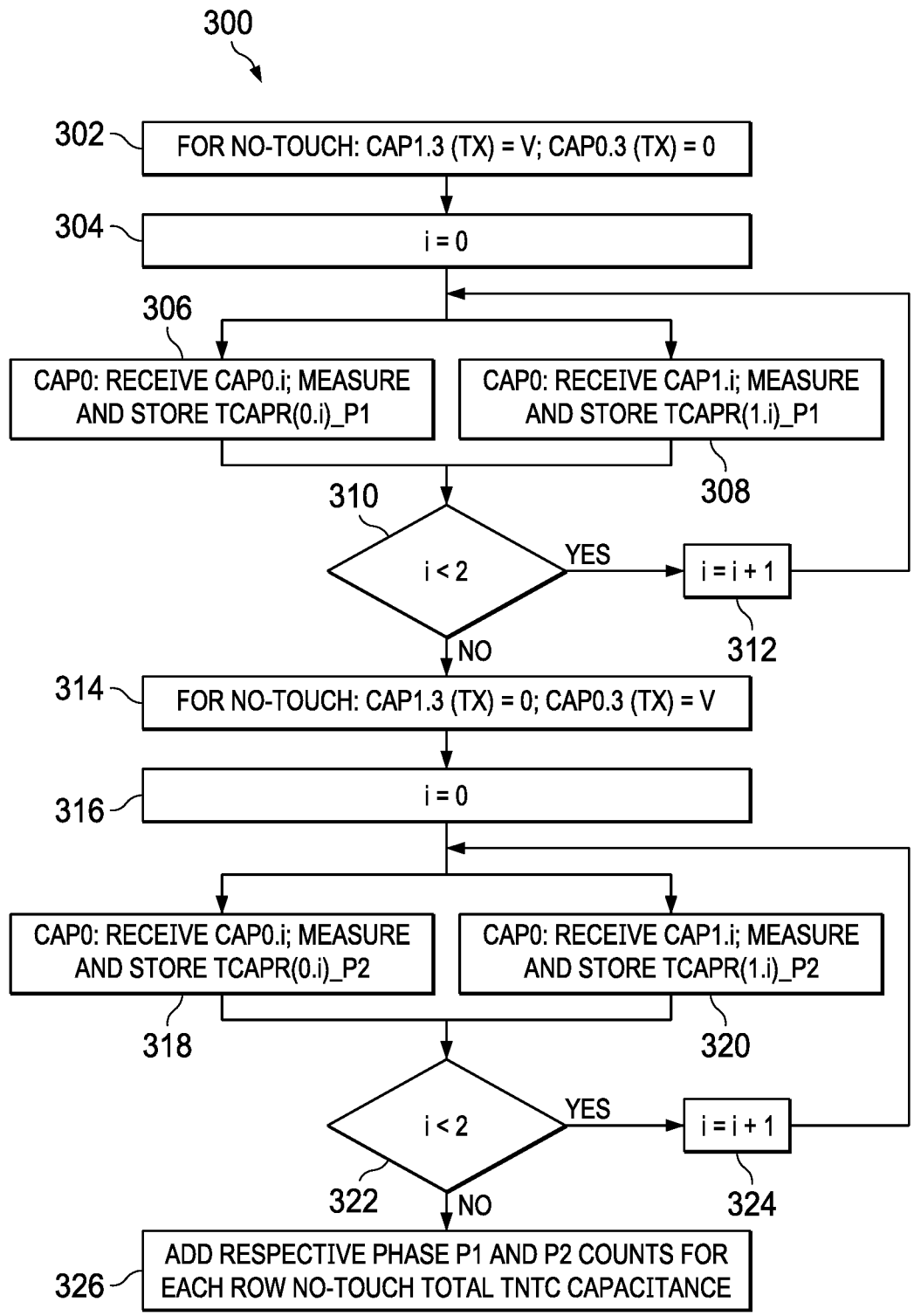
FIG. 3 illustrates a flowchart method of operating a preferred embodiment system in a two-phase no-touch initialization process.
Figure 4:
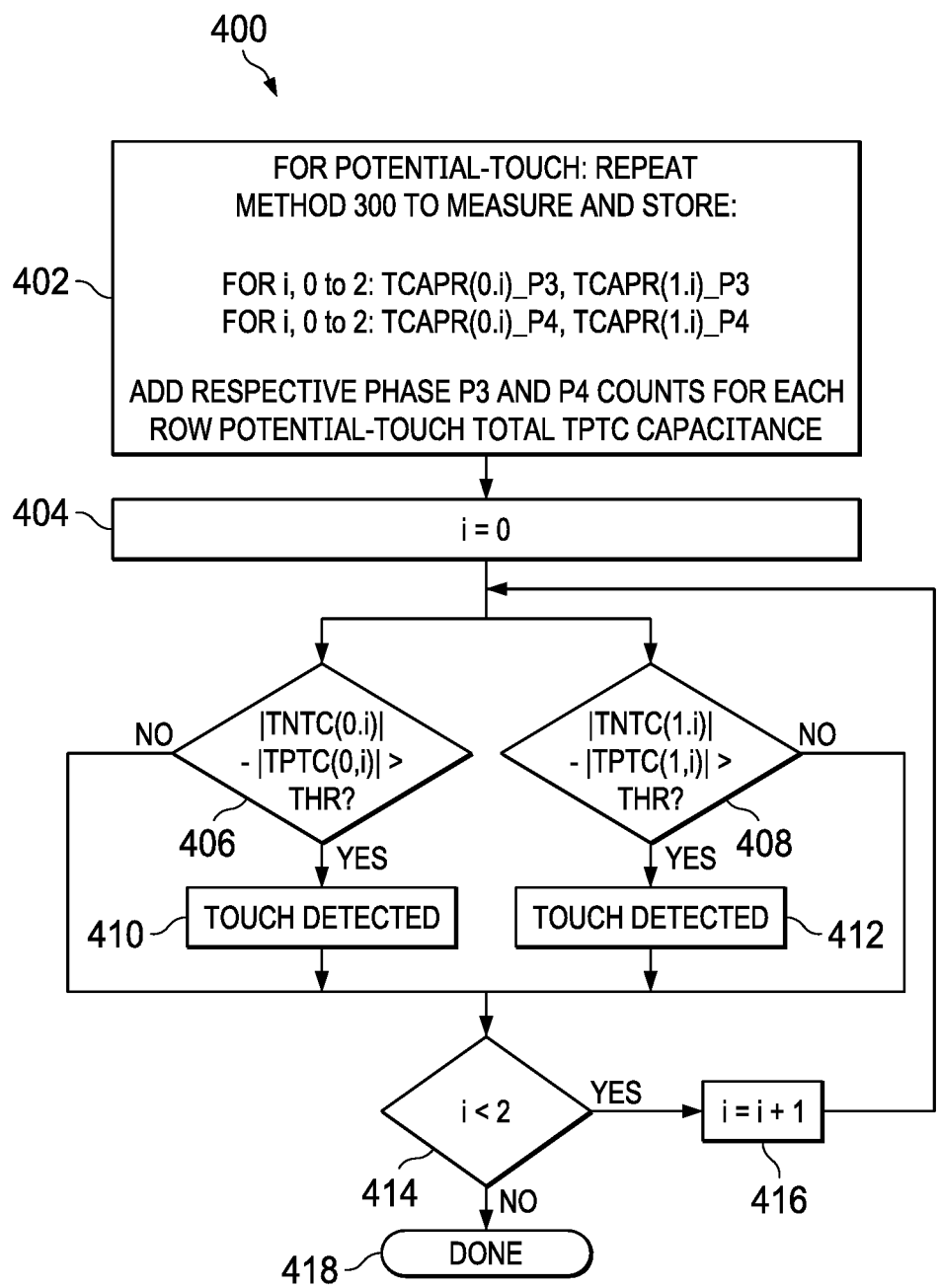
FIG. 4 illustrates a flowchart method of operating a preferred embodiment system in a two-phase potential-touch initialization process.

The operation of system 200 is now described, followed hereafter in more detail in connection with a flowchart method 300 in FIG. 3 and a flowchart method 400 in FIG. 4, where each method may be through software or otherwise executable code, included, for example, in controller 118, further augmented by hardware (not shown) in combination with sensor 100. By way of introduction to method 300, controller 118 of system 200 operates system 200 first in a two-phase no-touch initialization process to determine default capacitance measures in connection with no touch of a button in set 202, and by way of introduction to method 400, the FIG. 3 method 300 is followed by a by a two-phase potential-touch detection process to determine additional measures in connection with a potential touch of one or more buttons in set 202. By way of introduction, the measures are achieved by applying a TX voltage which connects to the bottom plate of each different button, and each capacitive measurement block CAP0 or CAP1 includes sufficient circuit hardware and/or software so as to measure the voltage received at an RX pin, where that voltage is representative of the total charge across the row of buttons. In preferred embodiments, that charge is transferred to an internal circuit and compared against a reference, from which a corresponding digital count is produced that is proportional to the total charge from the row of buttons; such a count may be achieved by a clocked circuit (e.g., 16 MHz) incrementing over a period of time during which a comparison value is exceeded—in effect, therefore, the digital count represents an analog-to-digital conversion of the total charge from the row, and that charge-related count is directly proportional to the capacitance of the row because, with voltage constant, charge is directly proportional to capacitance, namely, charge Q is the product of capacitance C and voltage V. Thus, the count values are hereinafter referred to as capacitive counts, intended to demonstrate a measure proportional to capacitance as manifested in preferred embodiments as a digital count. From the resultant capacitance counts, one or more concurrent button touches can be detected along each row of buttons.

Looking in more detail to FIG. 3, method 300 starts with a step 302 which begins a first phase in the two-phase no touch initialization process of method 300. Thus, method 300 can occur at device start-up or as a periodic initialization or re-initialization, at a time when it may be assumed that no touch is taking place to any button in set 202. Particularly and during such time, in step 302, pin CAP1.3 (TX) of measurement block CAP1 outputs (i.e., transmits) a voltage of V, and pin CAP0.3 (TX) of measurement block CAP0 outputs (i.e., transmits) a voltage of 0 (i.e., ground). As a result, therefore, and as introduced in connection with Table 3, a respective different voltage is connected to the bottom plate of each different button (i.e., different column) per a single row of buttons. In other words, the voltage difference between the outputs of pins CAP1.3 and CAP0.3 is divided by the resistor divider, consisting of resistors RR1 through RR4, across respective bottom plates of button capacitors in each row of buttons. Next, method 300 continues to step 304.

Step 304, and the steps including and through steps 306, 308, 310, and 312 shown after it in FIG. 3, provide a loop corresponding to a first phase (P1) in which the total capacitance of each row R1 through R6 of button set 202 is measured. More specifically, in step 304, a loop index i is initialized to 0, and in steps 306 and 308 measurement blocks CAP0 and CAP1 concurrently determine such capacitance measures, operating one row at a time as to the rows to which each respective block is connected. For example, when i=0, in step 306, measurement block CAP0 receives a total voltage at its pin CAP0.0 (RX), which therefore corresponds to the voltage across each of the capacitors in row R1; at the same time, also with i=0, in step 308, measurement block CAP1 receives a total voltage at its pin CAP1.0 (RX), which therefore corresponds to the voltage across each of the capacitors in row R4. Each measurement block operates as described above, to effectively convert the row voltage, representative of charge, to a digital capacitance count thereby indicating a measure of total capacitance for that row, where for convention the measure is shown in step 306, for the first phase P1, as TCAPR(0,$i$)_P1, so that when i=0 in the loop being described, then step 306 measures and stores a total capacitance of the capacitors in row R1 as TCAPR(0.0)_P1, and concurrently step 308 measures and stores a total capacitance of the capacitors in row R4 as TCAPR(1.0)_P1. Moreover, once steps 306 and 308 complete the concurrent measure and store operations for loop index i=0, step 310 is a condition check to determine if the loop is complete so that each block CAP0 or CAP1 has measured a response across all row Rx to which it is connected. Thus, since each such block is connected in the example of FIG. 2 to three such rows, then step 310 compares the loop index i, which starts at a value of 0, to a maximum threshold value of 2; if that maximum value is not yet met, step 312 increments the loop index count and steps 306 and 308 repeat for the incremented loop index. Thus, after one such increment, i=1, and the corresponding instance of step 306 measures and stores a total capacitance of the capacitors in row R2 as TCAPR(0.1)_P1, and concurrently step 308 measures and stores a total capacitance of the capacitors in row R5 as TCAPR(1.1)_P1. The loop index of i=1 will still satisfy the condition of step 310, causing one more increment of the index to i=2, so that a final loop instance of step 306 measures and stores a total capacitance of the capacitors in row R3 as TCAPR(0.2)_P1, and concurrently step 308 measures and stores a total capacitance of the capacitors in row R6 as TCAPR(1.2)_P1. Thereafter, the condition check of step 310 is no longer met, so method 300 continues from step 310 to step 314. In addition, therefore, one skilled in the art will now appreciate that as of this point, the first phase no-touch loop iterations will produce the count totals summarized in the following Table 4:

TABLE 4

| Loop index i | TCAPR(0.i)_P1 | TCAPR(1.i)_P1 |
|---|---|---|
| i = 0 | TCAPR(0.0)_P1 | TCAPR(1.0)_P1 |
| i = 1 | TCAPR(0.1)_P1 | TCAPR(1.1)_P1 |
| i = 2 | TCAPR(0.2)_P1 | TCAPR(1.2)_P1 |

Step 314, and the steps including and through steps 316, 318, 320, 322, and 324 shown after it in FIG. 3, provide a loop corresponding to a second phase (P2) in which again the total capacitance of each row R1 through R6 of button set 202 is again measured in a no-touch initialization process, but here the voltages of transmit pins CAP1.3 (TX) and CAP0.3 (TX) are reversed, as shown in step 314, as compared to step 302 above. In other words, whereas in step 302 pin CAP1.3 (TX) of measurement block CAP1 outputs a voltage of V and pin CAP0.3 (TX) of measurement block CAP0 outputs a voltage of 0, in step 314 pin CAP1.3 (TX) of measurement block CAP1 outputs a voltage of 0 and pin CAP0.3 (TX) of measurement block CAP0 outputs a voltage of V. Once more, therefore, a respective different voltage is connected to the bottom plate of each different button (i.e., different column) per a single row of buttons, as divided by the resistor divider consisting of resistors RR1 through RR4, but now the voltages are as shown in the following Table 5:

TABLE 5

| Column | Button bottom plate voltage |
|---|---|
| C1 | 0 |
| C2 | .25 V |
| C3 | .5 V |
| C4 | .75 V |
| C5 | V |

Given the earlier discussion of steps 304 to 312 and the now-evident commonality of those steps to steps 316 through 324, one skilled in the art will appreciate from that earlier discussion that steps 316 through 324 again sequence through a loop, which in the present example involves three iterations, and for each loop iteration measurement blocks CAP0 and CAP1 will measure and store respective capacitance measures for a respective row connected to a respective receive pin, where now the measures are in response to the voltages of Table 5 (and the row capacitance), where such storage can be in memory (not shown) in controller 118, but way of example. Thus, the loop iterations of this second phase P2 will produce the count totals summarized in the following Table 6:

TABLE 6

| Loop index i | TCAPR(0.i)_P2 | TCAPR(1.i)_P2 |
|---|---|---|
| i = 0 | TCAPR(0.0)_P2 | TCAPR(1.0)_P2 |
| i = 1 | TCAPR(0.1)_P2 | TCAPR(1.1)_P2 |
| i = 2 | TCAPR(0.2)_P2 | TCAPR(1.2)_P2 |

Having described a preferred embodiment apparatus and methodology for establishing a total no-touch capacitance count in each of two phases for button set 202, attention is now directed to a preferred embodiment achieved result provided from such counts. To simplify the following discussion, only a single row in set 202 is described, so for sake of example row R1 will be so described, but one skilled in the art should by the discussion conclusion appreciate that the following likewise applies to each of the other button set rows. For row R1, the first phase no-touch capacitance count measure produced TCAPR(0.0)_P1. Looking at that count in greater detail, recall during the first phase P1 that the voltages applied by blocks CAP0 and CAP1, and divided by resistors RR1 through RR4, are as shown in Table 3, and that the total capacitance count results from the voltage (proportional to charge and capacitance) for each button along the row. With these observations, therefore, as a result of the divided voltage, then the total count measure can be represented as a sum of the counts from each non-touched same-capacitance button, but also will result from the respective divided voltage across each such button, as shown in the following Equation 1:

$$TCAPR(0.0)\_P1=(1V*CB1)+(0.75V*CB2)+(0.5V*CB3)+(0.25V*CB4)+(0V*CB5) \quad \text{Equation 1}$$

where,

CB1 is the capacitance of button B1, CB2 is the capacitance of button B2, and so forth through CB5, which is the capacitance of button B5;

V is the voltage applied per Table 3, and with 0 volts at the end of the resistor divider connected to the bottom plate of button B5, the result of the last factor in Equation 1 (i.e., (0V*CB5) reduces to zero; and parasitic capacitance is not included, but is assumed to apply equally or substantially equally to each button, so as to be canceled out as a common factor in each capacitance measure for this (and other later-developed) Equation.

Note further, therefore, that in the second phase P2, again for row R1, the produced second phase no-touch count measure TCAPR(0.0)_P2, with the voltages reversed relative to the first phase due to the swapping of V and 0 volts at the ends of the resistor divider, will cause TCAPR(0.0)_P2 to be as shown in the following Equation 2:

$$TCAPR(0.0)\_P2=(0V*CB1)+(0.25V*CB2)+(0.5V*CB3)+(0.75V*CB4)+(1V*CB5) \quad \text{Equation 2}$$

Equations 1 and 2 assist with an understanding of a particular benefit of preferred embodiments, namely, that button capacitance (and detection of change, as detailed below) can be determined along a number of capacitive buttons, without requiring, as has been the case in various prior art implementations, a separate respective transmit pin (or so-called channel) for one plate of each different capacitor. Specifically, Equations 1 and 2 describe capacitance counts when reversing voltages on opposing ends of a voltage divider, with measurement block transmit pins connected only to those opposing ends, with a number (e.g., three, in system 200) of intermediate buttons (in columnar fashion in the example illustrated) connected to intermediate nodes along the voltage divider and between its opposing ends. Particularly, note now a preferred embodiment result achieved when Equations 1 and 2 are added, thereby providing a total no-touch count, TNTC(0.0) for row R1, as shown in the following Equation 3:

$$TNTC(0.0)=TCAPR(0.0)\_P1+TCAPR(0.0)\_P2= \\ (1V*CB1)+(0.75V*CB2)+(0.5V*CB3)+ \\ (0.25V*CB4)+(0V*CB5)+(0V*CB1)+ \\ (0.25V*CB2)+(0.5V*CB3)+(0.75V*CB4)+ \\ (1V*CB5)=V[(CB1)+(CB2)+(CB3)+(CB4)+ \\ (CB5)] \quad \text{Equation 3}$$

Equation 3 demonstrates that the no-touch phase P1 and phase P2 results can be added, as shown in step 326 of FIG. 3, in which case the entire row capacitance count, scaled by a factor of V, is realized by a preferred embodiment. As further demonstrated below, therefore, a comparable observation may be reached for instances of a touch, or more than one touch, along a row (or rows) of buttons, so that a preferred embodiment again achieves such a result without requiring a separate measurement block pin for each separate column of buttons. As detailed later, therefore, such a result has myriad advantages over the prior art.

Turning now to method 400 of FIG. 4, it preferably follows method 300 of FIG. 3 and is at a time when it is possible that a user is (or may) touching one or more buttons of set 202, thereby representing the above-introduced two-phase potential-touch detection process. Method 400 commences with a step 402, which is intended to indicate a repeat of the same steps of method 300, but at a different time when a touch is possible. Also, to simplify FIG. 4, only the resultant values are listed rather than repeating all of the information from method 300, with the expectation that the reader is or may become familiar with the earlier discussion of FIG. 3. Thus, again two different phases are conducted, and for sake of distinction in this discussion these two phases are referred to as a third phase P3 and a fourth phase P4, where in phase P3 the TX voltages are as shown in Table 3 and in phase P3 the TX voltages are as shown in Table 5. Also, during each phase, each measurement block CAP0 and CAP1 iterates through successive steps (e.g., akin to 306 or 306; and 318 or 320) so as to obtain a total capacitance per row (i.e., TCAPR), by measuring the voltage along each measurement block receive pin CAP0.$i$ or CAP1.$i$, according to an iterative loop index i. Thus, upon completion of these operations, there will be measured and stored the capacitive count values shown in step 402 in FIG. 4. Further, adding these two counts also is contemplated by the preferred embodiment, as also shown in step 402 and for reasons further explored below.

Given the preceding, since method 400 contemplates the possibility of a button touch (or more than one button touched) along a row as measured (e.g., by capacitance count) by a respective pin on either measurement block CAP0 or CAP1, then during method 400, a total capacitance during phase P3 will resemble that of phase P1 as shown in Equation 1, but can include the difference in capacitance in any one or more buttons, where such a difference may occur from a touch of that button. Thus, again as a result of the divided voltage, then the total capacitance count measure can be represented as a sum of the counts from each non-touched or touched button, as shown by way of example for row R1 in the following Equation 4:

$$TCAPR(0.0)\_P3=(1V*(CB1+\Delta CB1))+(0.75V*(CB2+\Delta CB2))+(0.5V*(CB3+\Delta CB3))+(0.25V*(CB4+\Delta CB4))+(0V*(CB5+\Delta CB5))  \qquad \text{Equation 4}$$

where, $\Delta CB1$ is the change, if any, on button B1 from a touch, $\Delta CB2$ is the change, if any, on button B2 from a touch, and so forth through $\Delta CB5$, which is the change, if any, on button B5 from a touch.

Similarly, therefore, in phase P4, again for row R1, the fourth phase produced potential-touch capacitance count measure TCAPR(0.0)_P4 will be comparable to TCAPR(0.0)_P3, but with the voltages reversed due to the swapping of V and 0 volts at the ends of the resistor divider, so that TCAPR(0.0)_P4 is as shown in the following Equation 5:

$$TCAPR(0.0)\_P4=(0V*(CB1+\Delta CB1))+(0.25V*(CB2+\Delta CB2))+(0.5V*(CB3+\Delta CB3))+(0.75V*(CB4+\Delta CB4))+(1V*(CB5+\Delta CB5)) \qquad \text{Equation 5}$$

As was the case of Equation 3 for the no-touch phases P1 and P2, therefore, in a preferred embodiment the results of Equations 4 and 5 for the potential-touch phases may be added, as also shown in step 402, to provide a total potential-touch capacitance count, TPTC(0.0) for row R1, as shown in the following Equation 6:

$$TPTC(0.0)=TCAPR(0.0)\_P3+TCAPR(0.0)\_P4=V\\{}[(CB1+\Delta CB1)+(CB2+\Delta CB2)+(CB3+\Delta CB3)+\\(CB4+\Delta CB4)+(CB5+\Delta CB5)] \qquad \text{Equation 6}$$

Equation 6 demonstrates that the potential-touch phase P3 and phase P4 results can be added, in which case the entire row capacitance count, scaled by a factor of V, also is realized by a preferred embodiment. Moreover, while the above illustrates these concepts for row R1, also contemplated in a preferred embodiment is the concurrent or sequential determination of respective total counts for all other rows in set 202. As further demonstrated below, therefore, such results may be used in the remainder of method 400, and in various preferred embodiment approaches, to detect a touch (or multiple touches) along a row in button set 202.

Continuing with method 400, after the total potential-touch capacitance count for each row in set 202 is determined in step 402, then method 400 continues to step 404, in which the loop index i is again initialized to a value of 0, so as to begin a set of iterations for all loop indices (e.g., through 2), so as to determine whether any of row R1 through R6 of set 202 incurred a touch. More specifically, after step 404 initializes the loop index to 0, steps 406 and 408 concurrently evaluate already-measured touch counts to determine if a touch has occurred, as may be determined by measurement blocks CAP0 and CAP1 or by core 118C (see FIG. 2). For example, when i=0, in step 406, measurement block CAP0 (or core 118C0 compares the absolute value of the total non-touch counts TNTC measured and stored for the row (i.e., row R1), that is corresponding to the index i=0 for pin CAP0.0 (RX), to the absolute value of the total potential-touch counts TPTC measured and stored for the same row; in a preferred embodiment, such a comparison is achieved by subtracting the absolute value of TPTC from the absolute value of TNTC and comparing the different to a threshold THR. In other words, if the absolute value of TPTC and the absolute value of TNTC are the same (or similar), then the difference between the two will be zero or near-zero; in contrast, by setting the value of threshold THR according to: (i) expected capacitance for no-touch; and (ii) expected capacitance for a potential-touch, then step 406 (or step 408) will be determined in the affirmative if a touch occurs and is thereby detected by step 406 as indicated by step 410, or in the negative if a touch does not occur, in which case method 400 continues to step 414. Note that the preceding uses absolute value so that either an increase or decrease of delta capacitance would be detected—in this regard, in general a touch in mutual mode which will drive the count to decrease, whereas the touch in self-mode may drive the count to increase or decrease, based on different PCB sensors. Similarly, while step 406 makes the determination relative to the rows R1 through R3 connected to block CAP0, similarly step 408 makes a comparable determination relative to the rows R4 through R6 connected to block CAP1. In any event, once each row count is compared by steps 406 and 408, the remaining steps 414 and 416 will ensure that the loop index sequences through all desired iterations, which in the example of the illustrated preferred embodiment is a total of three iterations (i.e., i=0, 1, 2), corresponding to the total number of rows per measurement block CAP0 or CAP1. Thus, a comparison is made for each different row, and a sufficient difference in measured capacitance, between the no-touch and potential-touch measures, will result in a detection of a touch along a row.

The above demonstrates detecting when any button in an entire row is touched, where such detection is as indicated in step 410 or step 412. In a preferred embodiment, each of those steps may further include additional comparisons so as to determine, for a row in which a touch was detected, which button or buttons in the row were so touched. Particularly, as demonstrated above, in a given phase, a capacitance change corresponding to a touch on a button will be scaled by the voltage across that button. Hence, steps (e.g., through software or otherwise executable code, included, for example, in controller 118) may be readily performed by comparisons (e.g., subtraction; threshold comparison) to determine, from a particular change in count, the scaled difference between the no touch and detected touch scenario, with that scaled difference corresponding to a particular button. For example, assume that the counter difference in Equation 1 in the no touch phase and the touch phase is determined to be a factor or 0.75; that value, therefore, corresponds to button B1, as in Equation 1 its capacitance is scaled by the voltage division of 0.75—in this example, therefore, step 410 not only detects a row touch, but further detects that the button so touched was button B1. Similar examples may be readily determined by one skilled in the art, given the teachings of this document and the skill in the art, and functionality may be readily incorporated into software, executed by controller 118, for evaluating such touch or touches along a row, for any number of resistors in the resistor divider connected across the columns of button set 202. However, also recognized in this regard is that as the number of such resistors increases, at some point diminishing returns may be reached by demanding too much processing resources to resolve specific button touches, so in a preferred embodiment the number of such resistors is six or less.

From the above, various preferred embodiments provide a system that includes capacitive sensing among groups (e.g., rows) of capacitive buttons in a set (e.g., grid, or slider) of buttons. Various preferred embodiments have been described with attendant aspects and/or benefits. For example, and as has been shown, the buttons may be connected as a grid or array, in which case for a number of columns NC, the number of TX pins NTC connected to those columns is less than NC, as the voltage (e.g., resistor) divider and described methodology may be implemented so that each intermediate node along the resistor divider and between its end nodes is connected to a respective button column in the grid, where the total number of intermediate nodes TIN is equal to NC-2. In the example of FIG. 2, therefore, NC=5 and TIN=3, where a separate TX pin is not required for each of the TIN=3 columns. As a result, fewer pins and corresponding internal circuitry are required of the measurement blocks, or, stated alternatively, the total number of pins on the measurement block(s) may be used all for receiving capacitive signals, with the exception of only two of those pins required for the TX function to the button set. Accordingly, a much larger number of buttons may be served with the same amount of pins, as compared to an approach in which each column and each row requires a respective separate capacitance measurement block pin. As another example, the preferred embodiment is able to detect multiple touches, either along a single row or among different rows in the same button set. Thus, the preferred embodiments have been shown to have numerous benefits, and various embodiments have been provided. As still another benefit, various modifications have been described and others may be contemplated or discernable by one skilled in the art, such as a grid with a different number of rows and columns, a different number of intermediate nodes between two biasing pins, different types of capacitive buttons, and so forth. Accordingly, while various alternatives have been provided according to the disclosed embodiments, still others are contemplated and yet others may be ascertained by one skilled in the art. Given the preceding, therefore, one skilled in the art should further appreciate that while some embodiments have been described in detail, various substitutions, modifications or alterations can be made to the descriptions set forth above without departing from the inventive scope, as is defined by the following claims.

The invention claimed is:

1. A capacitive touch sensing device, comprising:
   a logical array of capacitive buttons having a set of rows and a set of columns, wherein the set of columns includes a first column, a second column, and a set of intermediate columns arranged between the first column and the second column;
   a controller that includes:
      a first transmit pin coupled to the first column; and
      a second transmit pin coupled to the second column, wherein the set of columns is free of any coupling to any transmit pin other than at the first column and the second column; and
   a resistor divider coupled between the first transmit pin and the second transmit pin, wherein the resistor divider is further coupled to the set of columns, wherein the controller is configured to detect a capacitive touch by:
      applying a first voltage potential across the first transmit pin and the second transmit pin;
      determining a first set of charge measurements based on the first voltage potential that includes a charge measurement for each row of the set of rows;
      applying a second voltage potential across the first transmit pin and the second transmit pin that is opposite to the first voltage potential;
      determining a second set of charge measurements based on the second voltage potential that includes a charge measurement for each row of the set of rows; and
      adding the first set of charge measurements to the second set of charge measurements to determine a row capacitance for each row of the set of rows.

2. The capacitive touch sensing device of claim 1:
   wherein the resistor divider comprises a plurality of resistors connected in series; and
   wherein each resistor in the resistor divider has a same resistance value.

3. The capacitive touch sensing device of claim 1:
   wherein each button of the logical array of capacitive buttons has a respective bottom plate;
   wherein the first transmit pin is coupled to each bottom plate of a plurality of capacitive buttons in the first column;
   wherein the second transmit pin is coupled to each bottom plate of a plurality of capacitive buttons in the second column; and
   wherein each bottom plate of a plurality of capacitive buttons in an intermediate column is coupled together.

4. The capacitive touch sensing device of claim 1 wherein the controller includes receiving circuitry configured to recieve a respective receive signal from each row of the set R of rows.

5. The capacitive touch sensing device of claim 4 wherein the cotroller is further configured to determine the first set of charge measurements and the second set of charge measurements based on the respective receive signal from each row of the set of rows.

6. The capacitive touch sensing device of claim 5 wherein the controller is configured to:
perform, during a no-touch phase, the applying of the first voltage potential, the determining of the first set of charge measurements, the applying of the second voltage potential, and the determining of the second set of charge measurements such that the row capacitance for each row of the set of rows is a first row capacitance and is associated with no touch of the logical array of capacitive buttons.

7. The capacitive touch sensing device of claim 6 wherein the controller is further configured to, during a potential-touch phase:
apply the first voltage potential across the first transmit pin and the second transmit pin;
determine a third set of charge measurements based on the first voltage potential that includes a charge measurement for each row of the set of rows;
apply the second voltage potential across the first transmit pin and the second transmit pin;
determine a fourth set of charge measurements based on the second voltage potential that includes a charge measurement for each row of the set of rows; and
add the third set of charge measurements to the fourth set of charge measurements to determine a second row capacitance for each row of the set of rows that is associated with the potential-touch phase.

8. The capacitive touch sensing device of claim 7, wherein the controller is configured to determine whether a button of the logical array of capacitive buttons was touched in response to a comparison of the first row capacitance and the second row capacitance.

9. The capacitive touch sensing device of claim 1 wherein each capacitive button comprises:
a first electrode;
a second electrode;
a dielectric between the first electrode and the second electrode; and
an overlay material adjacent a surface of the first electrode and the second electrode.

10. The capacitive touch sensing device of claim 1 and further comprising a printed circuit board;
wherein a first integrated circuit is affixed to the printed circuit board and comprises the logical array, the controller, the first transmit pin, and the second transmit pin.

11. A method of operating a capacitive touch sensing device, the device comprising:
a logical array of capacitive buttons having a set of rows and a set of columns, wherein the set of columns includes a first column, a second column, and a set of intermediate columns arranged between the first column and the second column;
a first transmit pin coupled to the first column, the first transmit pin providing a first transmit voltage to the first column;
a second transmit pin coupled to the second column, the second transmit pin providing a second transmit voltage to the second column, wherein the set of columns is free of any coupling to any transmit pin other than at the first column and the second column; and
a resistor divider coupled between the first transmit pin and the second transmit pin, wherein the resistor divider is further coupled to the set of columns, wherein the method comprises:
applying a first voltage potential across the first transmit pin and the second transmit pin;
determining a first set of charge measurements based on the first voltage potential that includes a charge measurement for each row of the set of rows;
applying a second voltage potential across the first transmit pin and the second transmit pin that is opposite to the first voltage potential;
determining a second set of charge measurements based on the second voltage potential that includes a charge measurement for each row of the set of rows; and
adding the first set of charge measurements to the second set of charge measurements to determine a row capacitance for each row of the set of rows.

12. The method of claim 1, wherein the applying of the first voltage potential, the determining of the first set of charge measurements, the applying of the second voltage potential, and the determining of the second set of charge measurements are performed during a no-touch phase such that the row capacitance is a first row capacitance and is associated with no touch of the logical array of capacitive buttons.

13. The method of claim 12 and further comprising, during a potential-touch phase:
applying the first voltage potential across the first transmit pin and the second transmit pin;
determining a third set of charge measurements based on the first voltage potential that includes a charge measurement for each row of the set of rows;
applying the second voltage potential across the first transmit pin and the second transmit pin;
determining a fourth set of charge measurements based on the second voltage potential that includes a charge measurement for each row of the set of rows; and
adding the third set of charge measurements to the fourth set of charge measurements to determine a second row capacitance for each row of the set of rows that is associated with the potential-touch phase.

14. The method of claim 13, further comprising:
determining whether a button of the logical array of capacitive buttons was touched in response to a comparison of the first row capacitance and the second row capacitance.

15. The capacitive touch sensing device of claim 1 wherein the first transmit pin is coupled to a bottom capacitor of multiple capacitors of the first column and the second transmit pin is coupled to a bottom capacitor of multiple capacitors of the second column, and wherein the set of intermediate columns is configured to receive respective transmit voltages provided by the resistor divider.

16. The capacitive touch sensing device of claim 1, wherein the controller is configured to determine the first set of charge measurements by concurrently measuring a charge associated with a first subset of the set of rows and measuring a charge associated with a second subset of the set of rows.

17. A device comprising:
an array of capacitors coupled to have a set of rows and a set of columns, wherein the set of columns includes a first column, a second column, and a set of intermediate columns arranged between the first column and the second column;

a controller that includes:
  a first output directly coupled to the first column; and
  a second output directly coupled to the second column; and
  a set of inputs that includes a respective input coupled to each row of the set of rows; and
a resistor divider coupled between the first transmit pin and the second transmit pin that includes at least one resistor coupled to each column of the set of columns, wherein the controller is configured to detect a capacitive touch by:
  applying a first voltage potential across the first output and the second output;
  determining, using the set of inputs, a first set of charge measurements based on the first voltage potential that includes a charge measurement for each row of the set of rows;
  applying a second voltage potential across the first output and the second output that is opposite to the first voltage potential;
  determining, using the set of inputs, a second set of charge measurements based on the second voltage potential that includes a charge measurement for each row of the set of rows; and
  adding the first set of charge measurements to the second set of charge measurements to determine a row capacitance for each row of the set of rows.

18. The device of claim 17, wherein the controller is configured to:
  perform, during a no-touch phase, the applying of the first voltage potential, the determining of the first set of charge measurements, the applying of the second voltage potential, and the determining of the second set of charge measurements such that the row capacitance for each row of the set of rows is a first row capacitance and is associated with no touch of the array of capacitive buttons.

19. The device of claim 18, wherein the controller is configured to, during a potential-touch phase:
  apply the first voltage potential across the first output and the second output;
  determine, using the set of inputs, a third set of charge measurements based on the first voltage potential that includes a charge measurement for each row of the set of rows;
  apply the second voltage potential across the first output and the second output;
  determine, using the set of inputs, a fourth set of charge measurements based on the second voltage potential that includes a charge measurement for each row of the set of rows; and
  add the third set of charge measurements to the fourth set of charge measurements to determine a second row capacitance for each row of the set of rows that is associated with the potential-touch phase.

20. The device of claim 18, wherein the controller is configured to determine the first set of charge measurements by concurrently measuring a charge associated with a first subset of the set of rows and measuring a charge associated with a second subset of the set of rows.

* * * * *